L. L. MAST.
COUPLING FOR SECTIONAL RODS.
APPLICATION FILED FEB. 19, 1914.
1,140,052.
Patented May 18, 1915.
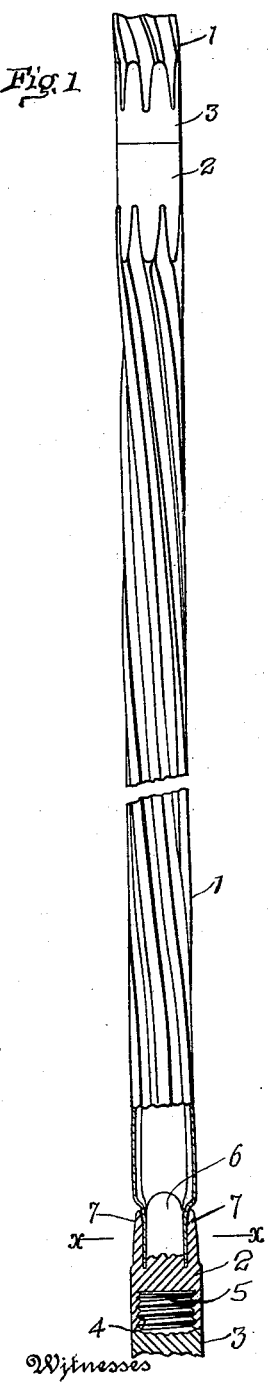
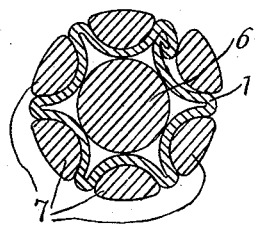
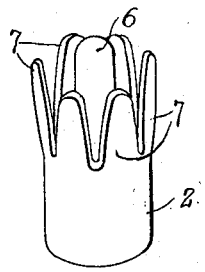
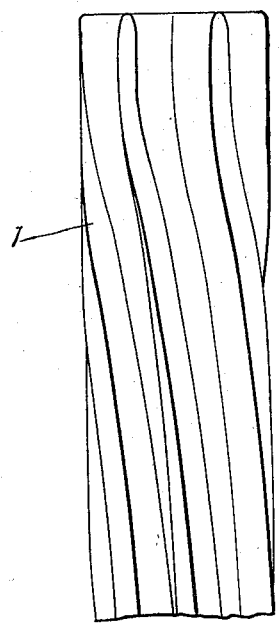
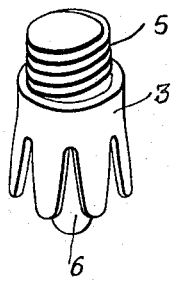
Inventor
Louis L. Mast,

UNITED STATES PATENT OFFICE.

LOUIS L. MAST, OF WEST MILTON, OHIO.

COUPLING FOR SECTIONAL RODS.

1,140,052.  Specification of Letters Patent.  Patented May 18, 1915.

Application filed February 19, 1914. Serial No. 819,669.

*To all whom it may concern:*

Be it known that I, LOUIS L. MAST, a citizen of the United States, residing at West Milton, in the county of Miami and State of Ohio, have invented certain new and useful Improvements in Couplings for Sectional Rods, of which the following is a specification, reference being had therein to the accompanying drawing.

This invention relates to a coupling for sectional rods and is designed more particularly for use in connection with lightning rods.

Lightning rods are now commonly formed from copper tubing and for convenience in manufacture and shipment this tubing is made up in comparatively short sections, the sections being usually about ten feet in length. The several sections are united in endwise relation when the rod is erected and when so united constitute the completed lightning rod.

The object of the present invention is to provide a coupling comprising two parts which can be secured to the respective sections of the rod at the factory and which may be readily connected one to the other when the rod is erected to unite the sections into a continuous rod.

It is a further object of the invention to so construct the coupling that it will not only form a strong mechanical connection between the sections of the rod but will form a good electrical conductor.

A further object of the invention is to so construct the coupling that it can be manufactured at a low cost; and that the members thereof can be quickly and easily connected with the respective rod sections and that such connection will be a strong and durable one.

In the accompanying drawings, Figure 1 is an elevation of a portion of a lightning rod having two of my couplings applied thereto, one of these couplings being in elevation and the other in section; Fig. 2 is a transverse, sectional view taken on the line *x x* of Fig. 1; Fig. 3 is a detail view of one end of one of the rod sections showing the corrugations therein; and Figs. 4 and 5 are detail views of the coupling showing the two parts thereof separated.

In these drawings I have illustrated one embodiment of the invention and have shown the same as applied to a lightning rod formed of metal tubing having spiral corrugations extending lengthwise thereof, but it will be understood that the invention herein illustrated may be used in connection with rods or similar parts of various kinds and that it is not necessary to the application of the coupling that the rod should be hollow throughout its length but it is sufficient if the two rods or two sections of the rod to be connected have openings in their ends to receive the cores of the coupling members.

In the embodiment of the invention here illustrated the lightning rod is formed in a plurality of sections indicated by the reference numeral 1. Each section consists of a length of metal tubing, preferably copper and this tubing is corrugated lengthwise of the sections and spirally thereof. In the present instance I have provided the sections of the rod with six longitudinal corrugations or ribs. I have chosen this number because it enables me to so corrugate the rod as to give it the desired qualities, that is, to enable it to be bent or shaped without destroying its shape, and at the same time, owing to the large number of corrugations produced, each corrugation or rib extends about the axis of the rod only a few times and, therefore, the coil which these corrugations tend to form has but a few convolutions and the effect produced by the electricity traveling about these convolutions is greatly reduced. The machine upon which these hollow rods are formed and corrugated is of such a character that the end portions of the corrugations are substantially straight or parallel with the axis of the rod. While this arrangement of the corrugations is such as to facilitate the application of my invention to the rod it is by no means necessary.

The coupling which I have provided consists broadly of two members having means for separably connecting the same one to the other, each section being provided with a core, adapted to extend into the open end of the rod section to which it is to be attached, and having one or more parts or fingers arranged to extend upon the exterior of the rod section when the core has been placed within the opening in the rod. These parts or fingers are of such a character that they may be pressed against the outer wall of the rod, thereby pressing the material firmly against the core and clamping the coupling member rigidly to the end of the section. The details of the construction may be varied but in the present embodiment of the invention I have shown the coupling as comprising two members 2 and 3, the member 2 having a screw-threaded socket 4 adapted to receive a screw-threaded lug or projection 5 on the member 3. In the application of the coupling to the rod sections the socket member 2 is secured to one end of each section and the member 3 to the other end, thereby enabling the sections to be connected one to the other to form a continuous rod of any desired length. Each section of the coupling has a portion, such as a core 6, adapted to extend into the opening in the end of the rod to which the coupling member is to be connected. In the present instance this core extends into the hollow end of the tube forming the rod section and is of a diameter substantially equal to the smallest inside diameter of such corrugated section. Each section also has one or more other parts arranged to be pressed against the outer surface of the rod section to clamp the same against the core. As here shown these parts are in the form of fingers 6 arranged substantially parallel with the core 6 but flared slightly away from the core to facilitate the application of the coupling member to the end of the rod section. These fingers are especially desirable where the coupling is to be applied to a corrugated rod section and I prefer to employ one finger for each groove formed by the corrugations of the rod. In the present instance there are six such fingers. These fingers may be secured to the coupling member in any suitable manner but I prefer to form them integral therewith and, in the present instance, they are formed on the coupling member by casting the member as one piece. The fingers are preferably of brass or copper and can be bent inward and pressed against the metal walls of the rod to clamp these walls against the core 6. The thickness of the fingers and the stiffness of the metal is such that they will be retained firmly in the positions to which they have been pressed until a very considerable force has been applied to them to force them outward. The force required for this is greater than the strength of the metal forming the rod and this metal will give way before the fingers will yield sufficiently to permit it to slip. The coupling members may be applied to the rod sections in any suitable manner, but preferably a clamping device is provided for forcing the fingers firmly into position. Inasmuch as this device does not form a part of the present invention it is not here shown.

The operation and manner of use of the coupling will be apparent from the foregoing description. The coupling is applied to the end of the rod section by inserting a core in the hollow end and pressing the fingers against the outer surface of the rod. This completes the rod section. When the sections are on the job and ready to be erected the ends of the rod sections are brought together and the couplings screwed one into the other, thereby quickly and firmly uniting the rod and after the rod is in position the sections can not be separated except by beginning at one end and systematically tearing down the rod as a whole. Further, the connections between the tubular sections of the rod and the couplings are as strong or stronger than the metal of the tubular sections and, consequently, the connections will stand all the strain that the rods themselves will stand.

While I have shown and described one embodiment of my invention it will be understood that this has been chosen for the purposes of illustration only and that I do not desire to be limited to the details of construction shown and described, for obvious modifications will occur to a person skilled in the art.

Having thus fully described my invention, what I claim as new and desire to secure by Letters Patent, is:—

1. The combination, with a rod comprising a plurality of sections, the adjacent ends of said sections having openings, of a coupling for connecting said sections comprising two members having means for connecting them one to the other, each of said members having a part arranged to extend into the opening in one of said sections and also having a second part arranged to be pressed against the exterior of said section to clamp the material of said section between the two parts of said coupling member.

2. The combination, with a rod consisting of a plurality of sections, the adjacent ends of said sections having openings therein, of a coupling comprising two members, each member having a core to enter the opening in the adjacent end of one of said sections and having projections arranged to extend on the exterior of said section and to be pressed against the same to clamp the wall of the rod section between the core and the projections, the two members of said coupling having coöperating parts to detachably connect them one to the other.

3. In a lightning rod, the combination, with a plurality of hollow longitudinal corrugated sections, of a coupling to connect the adjacent ends of two of said sections comprising two members, each member having a core to extend into the adjacent end of one of said hollow sections and having a series of fingers arranged to extend into the exterior grooves of said corrugated rod sections and to be pressed inward to clamp said hollow rod between said fingers and said core, the two members of said coupling having coöperating parts to connect said members one to the other.

4. The combination, with a section of a rod having an opening in one end thereof, of a coupling member having a core extending into said opening and having fingers extending on the outside of said rod and adapted to be pressed inward to clamp the wall of said opening between said core and said fingers.

5. A coupling member comprising a core, and a plurality of fingers arranged substantially parallel with said core, spaced away therefrom and movable toward said core.

6. A coupling comprising a member having one end screw-threaded and having at the other end a reduced portion forming a core, a series of fingers formed integral with said member, extending substantially parallel with said core, spaced away therefrom and adapted to be pressed inward toward said core.

In testimony whereof, I affix my signature in presence of two witnesses.

LOUIS L. MAST.

Witnesses:
EDWARD L. REED,
F. W. SCHAEFER.

Copies of this patent may be obtained for five cents each, by addressing the "Commissioner of Patents, Washington, D. C."